United States Patent [19]

Mashita et al.

[11] Patent Number: 5,004,782

[45] Date of Patent: Apr. 2, 1991

[54] THERMOPLASTIC RESIN COMPOSITION

[75] Inventors: Kentaro Mashita; Takeshi Fujii; Tadayuki Oomae, all of Chiba, Japan

[73] Assignee: Sumitomo Chemical Company, Ltd., Osaka, Japan

[21] Appl. No.: 414,574

[22] Filed: Sep. 29, 1989

Related U.S. Application Data

[63] Continuation of Ser. No. 67,437, Jun. 29, 1987, abandoned, which is a continuation of Ser. No. 768,154, Aug. 22, 1985, abandoned.

[30] Foreign Application Priority Data

Aug. 31, 1984 [JP]  Japan ................................ 59-183250

[51] Int. Cl.$^5$ ...................... C08L 51/06; C08L 23/14; C08L 23/12
[52] U.S. Cl. ..................................... 525/64; 525/166; 525/176
[58] Field of Search ........................... 525/64, 176, 177

[56] References Cited

U.S. PATENT DOCUMENTS

| | | | |
|---|---|---|---|
| 4,172,859 | 10/1979 | Epstein | 525/109 |
| 4,548,985 | 10/1985 | Yazaki | 525/65 |
| 4,550,130 | 10/1985 | Kishida | 523/436 |

FOREIGN PATENT DOCUMENTS

| | | | |
|---|---|---|---|
| 45-30944 | 10/1970 | Japan . | |
| 45-30945 | 10/1970 | Japan . | |
| 56-074168 | 6/1981 | Japan | 525/176 |
| 57-105448 | 6/1982 | Japan | 525/64 |
| 58-47419 | 10/1983 | Japan . | |
| 59-115352 | 7/1984 | Japan . | |

OTHER PUBLICATIONS

WPI Abstract JP59115352.

*Primary Examiner*—Patricia Short
*Attorney, Agent, or Firm*—Cushman, Darby & Cushman

[57] ABSTRACT

A novel thermoplastic resin composition is provided. It has excellent balance in the physical properties and is usable as shaped articles, sheets and films having excellent appearance in uniformity and smoothness. The thermoplastic resin composition is a blend of a resin composition (D) with a copolymer (C) containing epoxy group, said (D) being composed of graft-modified polypropylene (A) by unsaturated carboxylic acid or anhydride thereof, with or without unmodified polypropylene, and saturated polyester resin (B). The copolymer (C) is composed of an unsaturated epoxy compound and ethylene, with or without an ethylenically unsaturated compound other than ethylene.

8 Claims, No Drawings

THERMOPLASTIC RESIN COMPOSITION

This is a continuation of application Ser. No. 07/067,437, filed June 29, 1987, now abandoned, which is a CON of 768,154, filed Aug. 22, 1985, now abandoned.

This invention relates to a novel thermoplastic resin composition usable as shaped articles, sheets and films by injection molding, extrusion molding and the like. More particularly, it relates to a novel thermoplastic resin composition excellent in balance among physical properties and appearance, which is composed of polypropylene resin, saturated polyester resin and copolymer containing epoxy group.

Polypropylene possesses excellent properties in processability, toughness, water resistance, gasoline resistance and chemical resistance. It has small specific gravity and is inexpensive. It has been hence conventionally used widely for various shaped articles, films and sheets.

However, polypropylene possesses shortcomings or difficulties to be improved in heat resistance, rigidity, impact resistance, paintability, adhesion and printability. These problems arrest the new development in commercial applications. In order to improve paintability, adhesion and printability, a process had been proposed wherein at least a part of polypropylene is modified by having such unsaturated carboxylic acid or anhydride thereof as maleic anhydride grafted thereon (Japanese Examined Patent Publication No. 47413/1983; Japanese Unexamined Patent Publication No. 49736/1983). However, the modification is not satisfactory yet in order to have impact resistance, heat resistance, rigidity or other properties substantially improved.

On the other hand, saturated polyester resins are widely used for automotive parts, and electric and electronic parts as an engineering resin having outstanding features in heat resistance, rigidity, strength and oil resistance. Further improvements are still expected, however, in processability, impact resistance (notched), water resistance and chemical resistance. Besides, it has essential difficulties, i.e., greater specific gravity than polyolefin, and is expensive.

From the viewpoint above, possibility of novel wider applications will be expected when a thermoplastic resin appears which possesses both features of polypropylene resin and saturated polyester resin, by blending polypropylene resin selected from modified polypropylene with or without unmodified polypropylene and saturated polyester resin. However, it is known that polypropylene resin is hardly compatible with saturated polyester resin. Blending simply causes too much damages to a mixture product: (1) since Barus effect of molten polymer is extreme, stable intake of extruded strand is next to impossible, and processability is greatly poor; (2) the injection molded articles are extremely nonuniform and are poor in appearance because of flow marks, and cannot be applicable practically for use in automotive parts or electronic and electric parts; and (3) the mechanical properties, in particular, impact resistance and tensile elongation of moldings are lower than those expected from the properties of the individual resins.

It is an object of this invention to provide a novel thermoplastic resin composition possessing an extremely satisfactory balance in properties including processability, rigidity, heat resistance, impact resistance, scratch resistance, paintability, oil resistance, chemical resistance and water resistance, and excelling in appearance in uniformity and smoothness.

According to the present invention, a thermoplastic resin composition is provided, which contains 2 to 30 parts by weight of a copolymer containing epoxy group (C) and 100 parts by weight of a resin composition composed of 50 to 90 wt. % of polypropylene resin (A) selected from modified polypropylene with or without unmodified polypropylene and 50 to 10 wt. % of saturated polyester resin (B).

The polypropylene resin (A) is modified polypropylene with or without unmodified polypropylene. Here, polypropylene refers to crystalline one. It includes, besides homopolymer of propylene, block or random copolymers of propylene copolymerized with, for example, ethylene, butene-1 or other α-olefin. The modified polypropylene is a product of graft modification of such homopolymer or copolymer of propylene with unsaturated carboxylic acid or its anhydride in the range of 0.05 to 20 wt. %, or preferably 0.1 to 10 wt. %. The melt index of this polypropylene resin (A) may be in the range of 0.1 to 100, preferably 0.5 to 40.

The homopolymer and block or random copolymers of propylene may be obtained by the reaction in the presence of a combined catalyst system of, for example, titanium trichloride and an alkylaluminum compound, which is familiar as the Ziegler-Natta type catalyst.

The modified polypropylene is graft-modified one with unsaturated carboxylic acid or its anhydride. Examples of monomers to be grafted include acrylic acid, methacrylic acid, maleic acid, itaconic acid, maleic anhydride and itaconic anhydride. Particularly, maleic anhydride is preferable.

Grafting the monomers onto polypropylene may be effected by various known methods. For example, polypropylene, a grafting monomer and a radical initiator are mixed, and kneaded in the molten state in an extruder. Alternatively, polypropylene is dissolved in an organic solvent such as xylene, and a radical initiator is added thereto under nitrogen atmosphere, then, the mixture is allowed to react under heat, cooled after the reaction, washed, filtered and dried. Furthermore, polypropylene may be irradiated with ultraviolet rays or radial rays, or brought into contact with oxygen or ozone in the presence of the grafting monomers.

Saturated polyester resin (B) is composed of a dicarboxylic acid moiety and a diol moiety. At least 40 mol. % of the former dicarboxylic acid moiety is terephthalic acid. The remaining acid, if any, is at least one of aliphatic dicarboxylic acids having 2 - 20 carbon atoms such as adipic acid, sebacic acid, dodecanedicarboxylic acid, etc., aromatic dicarboxylic acids such as isophthalic acid, naphthalenedicarboxylic acid, etc., and alicyclic dicarboxylic acids such as cyclohexanedicarboxylic acid, etc. The diol moiety is at least one of aliphatic glycol and alicyclic glycol, such as ethylene glycol, 1,3-propanediol, 1,4-butanediol, 1,6-hexanediol, 1,10-decanediol, 1,4-cyclohexanediol.

Polybutylene terephthalate and polyethylene terephthalate are most preferable. The saturated polyester resins (B) should have intrinsic viscosity of within the range of 0.5–3.0 (in o-chlorophenol, 25° C.). No product is obtained which has desirable mechanical properties, as long as saturated polyester resin (B) does not satisfy the intrinsic viscosity defined above.

The copolymer (C) containing epoxy group is a copolymer of an unsaturated epoxy compound and one or more ethylenically unsaturated compounds. The composition ratio of the copolymer (C) containing epoxy resin is not particularly limited, but the unsaturated epoxy compound may be contained by 0.1 to 50 wt. %, preferably 1 to 30 wt. %.

The unsaturated epoxy compound possesses an unsaturated group which is copolymerizable with an ethylenically unsaturated compound, and an epoxy group. For example, unsaturated glycidyl esters or unsaturated glycidyl ethers having the formula (1) or (2) below may be used.

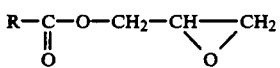 (1)

where R is a hydrocarbon group with 2 to 18 carbon atoms having an ethylenically unsaturated bond;

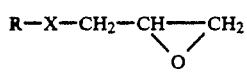 (2)

where R is the same as defined above and X is —CH$_2$O— or

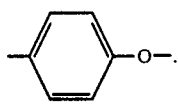

Examples thereof are glycidyl acrylate, glycidyl methacrylate, glycidyl itaconate, allyl glycidyl ether, 2-methylallyl glycidyl ether, p-styryl glycidyl ether and the like.

The ethylenically unsaturated compounds may be olefins, vinyl esters of saturated carboxylic acids having 2 to 6 carbon atoms, esters of saturated alcohol component having 1 to 8 carbon atoms with acrylic or methacrylic acid, maleates, methacrylates, fumarates, halogenated vinyl compounds, styrenes, nitriles, vinyl ethers and acrylamides. Examples are ethylene, propylene, butene-1, vinyl acetate, methyl acrylate, ethyl acrylate, methyl methacrylate, diethyl maleate, diethyl fumarate, vinyl chloride, vinylidene chloride, styrene, acrylonitrile, isobutyl vinyl ether, acrylamide and the like. Above all, ethylene is particularly preferable.

The copolymer (C) containing epoxy group may be prepared in various methods. One of the methods is a random copolymerization method in which an unsaturated epoxy compound is introduced into the trunk chain of the copolymer. Alternatively, a graft copolymerization method is effected in which an unsaturated epoxy compound is introduced as the side chain of the copolymer. Specifically, for instance, an unsaturated epoxy compound and ethylene are copolymerized in the presence of a radical initiator at 500 to 4,000 atmospheric pressures and 100° to 300° C., with or without a proper solvent or a chain transfer agent. Alternatively, an unsaturated epoxy compound and a radical initiator are mixed with polypropylene, and the mixture is molten in an extruder for graft copolymerization; or an unsaturated epoxy compound and an ethylenically unsaturated compound are copolymerized in the presence of a radical initiator in an inert solvent such as an organic solvent or water.

In the thermoplastic resin composition according to this invention, the polypropylene resin (A) as the first component is 50 to 90 wt. %, preferably 60 to 80 wt. % on the basis of (A) plus (B). If the polypropylene resin (A) is less than 50 wt. %, processability, toughness, water resistance and chemical resistance are not satisfactory, while more than 90 wt. %, favorable properties are not obtainable in the heat resistance, strength and rigidity. When modified polypropylene is used with unmodified polypropylene, it is necessary that the modified polypropylene should be 5 wt. % or more in the mixture. If the modified one is less than 5 wt. %, toughness and impact resistance obtained are not satisfactory and no substantial improvement is expected in paintability, adhesion and printability, since difficulty is encountered in compatible dispersion in the present resin composition.

The saturated polyester resin (B) as the second component is 50 to 10 wt. %, preferably 40 to 20 wt. % on the basis of (A) plus (B). If it is less than 10%, the heat resistance, ridigity and strength obtained are not sufficient, while if it exceeds 50 wt. %, processability, toughness, water resistance and chemical resistance obtained are not satisfactory. Besides, there are such drawbacks as higher specific gravity and increase in cost.

The copolymer (C) containing epoxy group is blended by 2 to 30 parts by weight, preferably 3 to 20 parts by weight, to the sum 100 parts by weight of the polypropylene resin (A) and the saturated polyester resin (B). If the copolymer (C) is less than 2 parts by weight, toughness and impact resistance are not sufficient, flow marks appear on the shaped articles to deteriorate the appearance and the extrusion stability is not good, since compatible dispersion of the resin composition is not satisfactory. If the copolymer (C) exceeds 30 parts by weight, favorable results are not obtained, because layer peeling occurs on the molded articles, and rigidity, toughness and impact resistance are greatly damaged.

The present composition may be used as it is. Alternatively, it may be in composite forms incorporating therein at least one of glass fibers, carbon fibers, polyamide fibers, metal whiskers or other reinforcing fiber materials, and silica, alumina, calcium carbonate, talc, mica, carbon black, $TiO_2$, ZnO, $Sb_2O_3$ or other inorganic fillers and flame retarding aids, lubricants, nucleating agents, plasticizers, dyestuffs, pigments, antistatic agents, antioxidants, weatherable aids or the like.

The resin composition of this invention is prepared by any of publicly known methods. Most preferred from a commercial point of view is to knead them in molten state, although it is effective to blend the components in a solution and evaporate the solvent or precipitate in a non-solvent. A Banbury mixer, extruders, rolls, kneaders and other ordinary machines may be used for the kneading in molten state. In the kneading, it is preferable to uniformly premix the resin components in powder or pellet form by means of tumblers, Henschel mixers or the like. It is possible, if necessary, to feed them quantitatively in separate ways into a kneading machine, without the premixing step.

The kneaded resin composition may be shaped by any of injection molding or extrusion molding. Alternatively, directly kneading in the melting and processing operation by blending in dry state at the time of injection molding or extrusion molding may be effected without the pre-kneading. In this invention, the kneading order is not particularly specified. That is, for example, the components (A), (B) and (C) may be kneaded altogether, or first (A) and (B) may be pre-kneaded before (C) is added. Any other kneading orders may be possible, except that first kneading (A) and (C), before adding (B), since gel may sometimes be formed and a favorable resin composition is not obtained.

Hereinafter this invention will be described in conjunction with the working examples, wherein they are merely illustrative ones, and this invention is not limited to them. In these examples, the tensile test is conducted according to JIS K 7113, the bending test JIS K 7203 (thickness 3.2 mm) and the Izod impact strength (thickness 3.2 mm) JIS K 7110.

The modified polypropylene and copolymers containing epoxy group, used in the examples and reference examples were prepared in the following prescriptions. As the polypropylene and the saturated polyester resin, commercial products were used.

(1) Modified polypropylene

It was prepared by referring to the method disclosed in the Japanese Examined Patent Publication No. 9925/1981.

Polypropylene, maleic anhydride and tertiary butylperoxy laurate were premixed. An extruder with a screw diameter of 30 mm and L/D ratio of 28 was set at a barrel temperature of 230° C., and the above mixture was fed in from a hopper, and the machine was operated at screw rotating speed of 60 rpm to promote the reaction. The modified polypropylene-molten strand discharged from the die of the extruder was cooled in water and then pelletized.

(2) Polypropylenes

Propylene homopolymer: Sumitomo Noblen W501 manufactured by Sumitomo Chemical Co., Ltd.

Propylene-ethylene-propylene block copolymer: Sumitomo Noblen AW564 manufactured by Sumitomo Chemical Co., Ltd.

(3) Saturated polyester resins

Polybutylene terephthalate: Toughpet PBT N1000 by Mitsubishi Rayon Co., Ltd.

Polyethylene terephthalate: MA2101 by Unitika Co., Ltd.

(4) Copolymers containing epoxy group

Glycidyl methacrylate-ethylene copolymer and glycidyl methacrylate-ethylene-vinyl acetate copolymer The copolymers were prepared by referring to the methods disclosed in the Japanese Unexamined Patent Publication No. 23490/1972 and Japanese Unexamined Patent Publication No. 11388/1973.

To a temperature-controllable 40-liter stainless steel reaction vessel equipped with proper feeding inlets, takeout outlet and an agitating device, were continuously supplied and agitated glycidyl methacrylate, ethylene, vinyl acetate, a radical initiator agent and a chain-transfer agent, and copolymerization was effected at 1,400 to 1,600 atmospheric pressures and 180° to 200° C.

Glycidyl methacrylate-grafted ethylene-vinyl acetate copolymer

It was manufactured by referring to the Japanese Examined Patent Publication No. 12449/1980.

Glycidyl methacrylate having dicumyl peroxide dissolved preliminarily was mixed with ethylene-vinyl acetate copolymer pellets, and the mixture was allowed to diffuse and penetrate at room temperature. The pellets impregnating glycidyl methacrylate were extruded at the terminal temperature of 170° C. by an extruder with 65 mmφ vent, and graft-copolymerized copolymer pellets containing epoxy group were obtained.

EXAMPLE 1

Preparation of modified polypropylene

Homopolymer (Sumitomo Noblen FS1012 manufactured by Sumitomo Chemical Co., Ltd.) as the base resin was modified with maleic anhydride to obtain modified polypropylene having maleic anhydride grafted by 0.11 wt. %.

This modified polypropylene, polybutylene terephthalate, and glycidyl methacrylate-ethylene-vinyl acetate copolymer (ratio by weight: 10-85-5) were blended at the rate mentioned in Table 1-1. They were preliminarily admixed for 20 minutes in a tumbler and charged into an extruder with 65 mmφ vent (manufactured by Ikegai Iron Works, Ltd.). The blend was molten and kneaded at 240° C., and a pelletized resin composition was obtained. After having been dried for 5 hours at 140° C., this composition was molded in a 10-ounce injection molding machine (model IS150E-V manufactured by Toshiba Corporation) at molding temperature of 240° C. and mold temperature of 70° C., and test pieces for measurement of the properties were obtained.

The test results of the obtained test pieces were as shown in Table 1-2.

The resin composition of this invention was good in stability of strand pulling in kneading by an extruder and very excellent in the appearance of injection molded piece. Besides, the balance of properties was excellent. In particular, the tensile elongation and Izod impact strength were extremely high. This substantiates the fact that the compatible dispersion of this resin composition is extremely excellent.

EXAMPLES 2-3

The modified polypropylene manufactured in Example 1, propylene homopolymer, polybutylene terephthalate and glycidyl methacrylate-ethylene-vinyl acetate copolymer (ratio by weight: 10-85-5) or glycidyl methacrylate-ethylene copolymer (ratio by weight 6:94) were blended at the rate mentioned in Table 1-1. They were mixed, kneaded and injection-molded in the same manner as in Example 1 to prepare test pieces for measurement of the properties. The test results are shown in Table 1-2.

The resin composition of this invention was good in stability of strand pulling in kneading by an extruder and very excellent in the appearance of injection molded piece. Besides, the balance of properties was excellent. In particular, the tensile elongation and Izod impact strength were extremely high. This exhibits that the compatible dispersion of this resin composition is extremely excellent.

Reference Example 1

The modified polypropylene manufactured in Example 1 and polybutylene terephthalate were blended at the rate mentioned in Table 1—1. They were mixed, kneaded and injection molded in the same manner as in Example 1 to prepare test pieces for measurement of the properties. The test results are shown in Table 1-2.

When copolymer containing epoxy group was not blended, the stability in strand pulling in kneading by an extruder was inferior to the present composition, and flow marks were observed on the injection molded pieces and the appearance was extremely poor. Besides, since the compatible dispersion was insufficient, the tensile elongation and Izod impact strength were particularly inferior to those of the present composition.

Reference Example 2

The modified polypropylene manufactured in Example 1, propylene homopolymer and polybutylene terephthalate were blended at the rate mentioned in Table 1-1. They were mixed, kneaded and injection molded in the same manner as in Example 1 to obtain test pieces for measurement of the properties. The test results are shown in Table 1-2.

Reference Example 3

Propylene homopolymer, polybutylene terephthalate and glycidyl methacrylate-ethylene-vinyl acetate copolymer (ratio by weight: 10-85-5) were blended at the rate in Table 1-1. They were mixed, kneaded and injection molded in the same manner as in Example 1 to prepare test pieces for measurement of the properties. The test results are shown in Table 1-2.

When copolymer containing epoxy group was blended, the stability in strand pulling in kneading by an extruder and appearance of injection molded piece were improved. However, since modified polypropylene was not blended, the compatible dispersion was not sufficient, and the tensile elongation and Izod impact strength were particularly inferior to those of the present composition.

TABLE 1-1

(Unit: wt. %)

| Resin Composition | Examples | | | Reference Examples | | |
|---|---|---|---|---|---|---|
| | Sample No. | | | | | |
| | 1 | 2 | 3 | 1 | 2 | 3 |
| Modified polypropylene[5] Homobase | 66 | 25 | 24 | 70 | 26 | — |
| Polypropylene[4] Homopolymer | — | 41 | 39 | — | 44 | 66 |
| Saturated polyester resin PBT[1] | 29 | 29 | 27 | 30 | 30 | 29 |
| Copolymer containing epoxy group | | | | | | |
| GMA-E-VA[2] | 5 | 5 | — | — | — | 5 |
| GMA-E[3] | — | — | 10 | — | — | — |

Notes
[1] Polybutylene terephthalate
[2] Glycidyl methacrylate-ethylene-vinyl acetate copolymer (ratio by weight: 10-8-5-5)
[3] Glycidyl methacrylate-ethylene copolymer (ratio by weight: 6-94)
[4] Polypropylene Melt Index (230° C., 2.16 kg) 8.0
[5] Modified polypropylene Melt Index (230° C., 2.16 kg) 30

TABLE 1-2

| Test results | Examples | | | Reference Examples | | |
|---|---|---|---|---|---|---|
| | Sample No. | | | | | |
| | 1 | 2 | 3 | 1 | 2 | 3 |
| Extrusion stability | Excellent | Excellent | Excellent | Poor | Poor | Excellent |
| Tensile strength (kg/cm²) | 310 | 320 | 300 | 320 | 340 | 280 |
| Tensile elongation (%) | 220 | 230 | 330 | 10 | 11 | 12 |
| Izod impact strength (kg·cm/cm) | | | | | | |
| Notched | 7.0 | 5.5 | 6.8 | 2.2 | 2.3 | 2.9 |
| Unnotched | 104 | 112 | Not broken | 24 | 28 | 40 |

TABLE 1-2-continued

| Test results | Examples | | | Reference Examples | | |
|---|---|---|---|---|---|---|
| | Sample No. | | | | | |
| | 1 | 2 | 3 | 1 | 2 | 3 |
| Bending strength (kg/cm²) | 490 | 500 | 470 | 550 | 570 | 460 |
| Bending modulus of elasticity (kg/cm²) | 16500 | 16600 | 16500 | 18500 | 18800 | 15000 |
| Appearance | Excellent | Excellent | Excellent | Good | Good | Excellent |

EXAMPLE 4

The modified polypropylene manufactured in Example 1, polybutylene terephthalate and gylcidyl methacrylate-ethylene copolymer (ratio by weight: 12-88) were blended at the rate in Table 2-1. They were mixed, kneaded and injection molded in the same manner as in Example 1 to obtain test pieces for measurement of the properties. The results are shown in Table 2-2.

EXAMPLES 5-7

The modified polypropylene manufactured in Example 1, propylene homopolymer, polybutylene terephthalate and a glycidyl methacrylate-ethylene (ratio by weight: 12-88) were blended. They were mixed, kneaded and injection molded in the same manner as in Example 1 to prepare test pieces for measurement of the properties. The test results are shown in Table 2-2.

Reference Example 4

The modified polypropylene manufactured in Example 1, propylene homopolymer and polybutylene terephthalate were blended at the rate in Table 2-1. They were mixed, kneaded and injection molded in the same manner as in Example 1 to obtain test pieces for measurement of the properties. The results are shown in Table 2-2.

Reference Example 5

The modified polypropylene manufactured in Example 1, propylene homopolymer, polybutylene terephthalate and glycidyl methacrylate-ethylene copolymer (ratio by weight: 12-88) were blended at the rate in Table 2-1. They were mixed, kneaded and injection molded in the same manner as in Example 1 to prepare test pieces for measurement of the properties. The test results are shown in Table 2-2.

When 1 part by weight of the copolymer containing epoxy group was blended with 100 parts by weight of the resin composition comprising the polypropylene resin and the saturated polyester resin, the compatible dispersion was not sufficient yet, while the stability in strand pulling in kneading by an extruder and appearance of injection molded piece were somewhat improved, but were not sufficient. The properties are also inferior to those of the present composition.

TABLE 2-1

(Unit: wt. %)

| Resin composition | Examples | | | | Reference Examples | |
|---|---|---|---|---|---|---|
| | Sample No. | | | | | |
| | 4 | 5 | 6 | 7 | 4 | 5 |
| Modified polypropylene[4] | 52 | 19 | 18 | 18 | 21 | 21 |

TABLE 2-1-continued

| | Examples | | | | Reference Examples | (Unit: wt. %) |
|---|---|---|---|---|---|---|
| | Sample No. | | | | | |
| Resin composition | 4 | 5 | 6 | 7 | 4 | 5 |
| Homobase Polypropylene[3] Homopolymer | — | 33 | 31 | 29 | 34 | 34 |
| Saturated polyester resin PBT[1] | 43 | 43 | 41 | 38 | 45 | 44 |
| Copolymer containing epoxy group GMA-E[2] | 5 | 5 | 10 | 15 | — | 1 |

Notes
[1]Polybutylene terephthalate
[2]Glycidyl methacrylate-ethylene copolymer (ratio by weight: 12-88)
[3]Polypropylene Melt Index (230° C., 2.16 kg) 8.0
[4]Modified polypropylene Melt Index (230° C., 2.16 kg) 30

TABLE 2-2

| | Examples | | | | Reference Examples | |
|---|---|---|---|---|---|---|
| | Sample No. | | | | | |
| Test results | 4 | 5 | 6 | 7 | 4 | 5 |
| Extrusion stability | Excellent | Excellent | Excellent | Excellent | Poor | Good |
| Tensile strength (kg/cm$^2$) | 370 | 380 | 310 | 310 | 410 | 420 |
| Tensile elongation (%) | 50 | 47 | 38 | 25 | 15 | 25 |
| Izod impact strength (kg-cm/cm) | | | | | | |
| Notched | 6.6 | 5.9 | 6.3 | 5.4 | 3.8 | 4.8 |
| Unnotched | 105 | 73 | 101 | 85 | 43 | 55 |
| Bending strength (kg/cm$^2$) | 560 | 560 | 490 | 430 | 640 | 610 |
| Bending modulus of elasticity (kg/cm$^2$) | 19300 | 19600 | 16500 | 14300 | 21500 | 21300 |
| Appearance | Excellent | Excellent | Excellent | Excellent | Poor | Good |

The resin composition of this invention was good in stability of strand pulling in kneading by an extruder, and very excellent in the appearance of injection molded pieces. Besides, the balance of properties was excellent. In particular, the tensile elongation and Izod impact strength were extremely high. This substantiates that the compatible dispersion of this resin composition is extremely excellent.

Reference Example 6

The modified polypropylene manufactured in Example 1, propylene homopolymer and polyethylene terephthalate were blended at the rate in Table 3-1. They were mixed, kneaded and injection molded in the same manner as in Example 9 to prepare test pieces for measurement of the properties. The test results are shown in Table 3-2.

The stability in strand pulling in kneading by an extruder and the appearance of injection molded piece were inferior to that of the present composition. Compatible dispersion were not sufficient yet, and the tensile elongation and Izod impact strength were particularly inferior to those of this invention.

EXAMPLE 8

Preparation of modified polypropylene

Propylene-ethylene-propylene block copolymer (Sumitomo Noblen AH561 manufactured by Sumitomo Chemical Co., Ltd.) as the base resin was modified with maleic anhydride to obtain a modified polypropylene having maleic acid grafted by 0.22 wt. %.

The above modified polypropylene, propyleneethylene-propylene block copolymer, polybutylene terephthalate and glycidyl methacrylate-ethylene-vinyl acetate copolymer (ratio by weight: 10-85-5) were blended at the rate in Table 3-1. They were mixed, kneaded and injection molded in the same manner as in Example 1 to obtain test pieces for measurement of the properties. The results are shown in Table 3-2.

Example 9

The modified polypropylene manufactured in Example 1, propylene homopolymer, polyethylene terephthalate and glycidyl methacrylate-ethylene copolymer (ratio by weight: 6-94) were blended at the rate mentioned in Table 3-1. They were premixed for 20 minutes in a tumbler and kneaded in the molten state at 270° C. in an extruder with 65 mm$\phi$ vent (manufactured by Ikegai Iron Work, Ltd.) to be pelletized, thus, a resin composition was obtained. After having been dried at 140° C. for 5 hours, this composition was molded into test pieces for measurement of the properties at molding temperature at 240° C. and mold temperature of 70° C. by a 10-ounce injection molding machine (model IS150-E-V manufactured by Toshiba Corporation). The test results were as shown in Table 3-2.

EXAMPLE 10

Preparation of modified polypropylene

Propylene-ethylene random copolymer (Sumitomo Noblen FA6411 manufactured by Sumitomo Chemical Co., Ltd.) as the base resin was modified with maleic anhydride to obtain modified polypropylene having maleic anhydride grafted by 0.14 wt. %.

The above modified polypropylene, propylene homopolymer, polybutylene terephthalate and glycidyl methacrylate-grafted ethylene-vinyl acetate (containing GMA by 4 wt. %) were blended at the rate in Table 3-1. They were mixed, kneaded and injection molded in the same manner as in Example 1 to obtain test pieces for measurement of the properties. The results are shown in Table 3-2.

TABLE 3-1

| | Examples | | | Reference Example | (Unit: wt. %) |
|---|---|---|---|---|---|
| | Sample No. | | | | |
| Resin composition | 8 | 9 | 10 | 6 | |
| Modified polypropylene | | | | | |
| Homobase[8] | — | 25 | — | 26 | |
| Block base[9] | 25 | — | — | — | |
| Random base[10] | — | — | 7 | — | |
| Polypropylene | | | | | |

TABLE 3-1-continued (Unit: wt. %)

|  | Examples | | | Reference Example |
|---|---|---|---|---|
| Resin composition | Sample No. | | | |
|  | 8 | 9 | 10 | 6 |
| Homopolymer[6] | — | 42 | 59 | 44 |
| Block copolymer[7] | 41 | — | — | — |
| Saturated polyester resin | | | | |
| PBT[1] | 29 | — | 29 | — |
| PET[2] | — | 29 | — | 30 |
| Copolymer containing epoxy group | | | | |
| GMA-E-VA[3] | 5 | — | — | — |
| GMA-E[4] | — | 5 | — | — |
| GMA-g-EVA[5] | — | — | 5 | — |

Notes
[1]Polybutylene terephthalate
[2]Polyethylene terephthalate
[3]Glycidyl methacrylate-ethylene-vinyl acetate copolymer (ratio by weight: 10-8-5-4)
[4]Glycidyl methacrylate-ethylene copolymer (ratio by weight: 6-94)
[5]Glycidyl methacrylate-grafted ethylene-vinyl acetate copolymer (containing glycidyl methacrylate by 4 wt. %)
[6]Polypropylene Homopolymer Melt Index (230° C., 2.16 kg) 8.0
[7]Polypropylene Block copolymer Melt Index (230° C., 2.16 kg) 2.0
[8]Modified polypropylene Homobase Melt Index (230° C., 2.16 kg) 30
[9]Modified polypropylene Block base Melt Index (230° C., 2.16 kg) 30
[10]Modified polypropylene Random base Melt Index (230° C., 2.16 kg) 10

TABLE 3-2

|  | Examples | | | Reference Example |
|---|---|---|---|---|
| Test results | Sample No. | | | |
|  | 8 | 9 | 10 | 6 |
| Extrusion stability | Excellent | Excellent | Excellent | Good |
| Tensile strength (kg/cm$^2$) | 250 | 330 | 300 | 370 |
| Tensile elongation (%) | 81 | 43 | 210 | 11 |
| Izod impact strength (kg · cm/cm) | | | | |
| Notched | 6.1 | 4.0 | 6.7 | 2.3 |
| Unnotched | 91 | 60 | 108 | 31 |
| Bending strength (kg/cm$^2$) | 380 | 490 | 470 | 540 |
| Bending modulus of elasticity (kg/cm$^2$) | 12800 | 18400 | 15300 | 20000 |
| Appearance | Excellent | Excellent | Excellent | Good |

EXAMPLES 11 TO 13

The modified polypropylene (16.5 wt. %) manufactured in Example 1, propylene homopolymer (27.6 wt. %), polybutylene terephthalate (18.9 wt. %), glycidyl methacrylate-ethylene-vinyl acetate copolymer (ratio by weight: 10-85-5) (7 wt. %) and various reinforcing agents (30 wt. %) shown in Table 4 were blended. They were mixed, kneaded and injection molded in the same procedure as in Example 1 to prepare test pieces. The test results are shown in Table 4.

TABLE 4

|  | Examples Sample No. | | |
|---|---|---|---|
| Test results | 7 | 8 | 9 |
| Reinforcing agent | Glass fiber | Talc | Mica |
| Extrusion stability | Excellent | Excellent | Excellent |
| Tensile strength (kg/cm$^2$) | 1050 | 420 | 470 |
| Tensile elongation (%) | 10 | 17 | 15 |
| Izod impact strength (kg · cm/cm) | | | |
| Notched | 14 | 6.2 | 5.6 |
| Unnotched | 94 | 79 | 57 |
| Bending strength (kg/cm$^2$) | 1380 | 680 | 760 |
| Bending modulus of elasticity (kg/cm$^2$) | 60600 | 32300 | 42300 |
| Appearance | — | Excellent | Excellent |

Glass fiber: RES06-TP37 made by Japan Glass Fiber Co. (fiber dia. 13 microns, length 3 mm)
Talc: JR-2 made by Hayashi Chemical Co. (mean particle size 8 microns)
Mica: 325 HK made by Kuraray Ltd. (mean particle size 40 microns)

The thermoplastic resin composition of this invention is excellent not only in processability, but also in various properties of the molded articles which are by far better than those of the individual components of the composition.

Moreover, the thermoplastic resin composition of this invention is easily able to be shaped into molded articles, films or sheets by any of working processes for thermoplastic resins familiar to the skilled, such as injection molding and extrusion molding. The shaped products are extremely balanced in rigidity, heat resistance, impact resistance, scratch resistance, paintability, oil resistance, chemical resistance and water resistance, and also have excellent appearance in uniformity and smoothness.

We claim:

1. A thermoplastic resin composition consisting essentially of:
   (1) 100 parts by weight of a resin composition (D) defined below, and
   (2) 2 to 30 parts by weight of copolymer (C) consisting of:
      (a) 99.9 to 50% by weight of ethylene and 0.1 to 50% by weight of an unsaturated epoxy compound selected from the group consisting of glycidyl acrylate, glycidyl methacrylate, glycidyl itaconate, allyl glycidyl ether, 2-methylallyl glycidyl ether and p-styryl glycidyl ether, or
      (b) 99.9 to 50% by weight of ethylene, 0.1 to 50% by weight of said unsaturated epoxy compound defined above and an ethylenically unsaturated compound selected from the group consisting of vinyl acetate, methyl acrylate, ethyl acrylate, methyl methacrylate, vinyl chloride, vinylidene chloride, and isobutyl vinyl ether,
   said resin composition (D) beig composed of 50 to 90 wt. % of polypropylene resin (A) which is 5-100% by weight of a grafted polymer consisting of a polypropylene and 0.05 to 20 wt. % of an unsaturated carboxylic acid or anhydride thereof, selected from the group consisting of acrylic acid, methacrylic acid, maleic acid, itaconic acid, maleic anhydride and itaconic anhydride, and 95-0% by weight of a polypropylene, and 50 to 10 wt. % of saturated polyester resin (B) composed of a dicarboxylic acid moiety, wherein at least 40 mol % of said dicarboxylic acid moiety is terephthalic acid, and a diol moiety.

2. A thermoplastic resin composition according to claim 1 wherein said resin composition (D) is composed of: 60-80 wt. % of said polypropylene resin (A) and 40-20 wt. % of said saturated polyester resin (B) wherein said thermoplastic resin composition contains 3-20 parts by weight of copolymer (C) per 100 parts by weight of said resin composition (D).

3. A thermoplastic resin composition according to claim 1, wherein said polypropylene is a crystalline copolymer of propylene and at least one other other α-olefin.

4. A thermoplastic resin composition according to claim 1 wherein said grafted polymer of polypropylene contains 0.1–10 wt. % of said carboxylic acid or anhydride thereof.

5. A thermoplastic resin composition according to claim 1, wherein said unsaturated carboxylic acid or anhydride in the polypropylene-resin (A) is maleic anhydride.

6. A thermoplastic resin composition according to claim 1, wherein said polyester resin (B) has an intrinsic viscosity of 0.5 to 3.0 in o-chlorophenol at 25° C.

7. A thermoplastic resin composition according to claim 1, wherein said polyester resin (B) is polybutylene terephthalate or polyethylene terephthalate.

8. A thermoplastic resin composition according to claim 1, wherein the amount of said unsaturated epoxy compound contained in (C) is 1–30 wt. %.

* * * * *